Figures 1, 2:
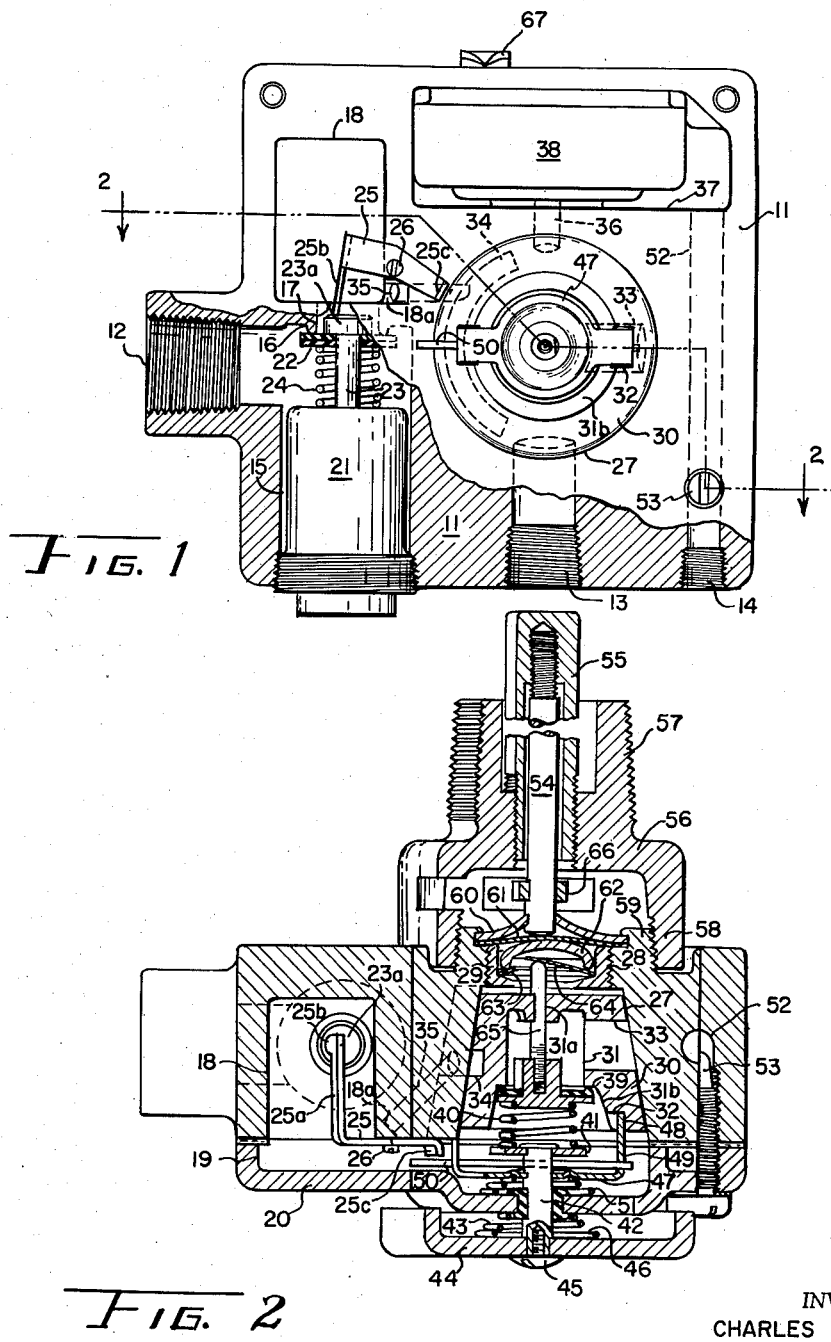

INVENTOR.
CHARLES D. COFFEY
BY
ATTORNEY

United States Patent Office 2,968,309
Patented Jan. 17, 1961

2,968,309

COMBINATION VALVE

Charles D. Coffey, Inglewood, Calif., assignor to Minneapolis-Honeywell Regulator Company, Minneapolis, Minn., a corporation of Delaware Filed Dec. 30, 1958, Ser. No. 783,937

4 Claims. (Cl. 137—66)

This invention relates to combination valve of the type embodying a safety valve, a manually operable valve, and a thermostatic valve. More particuraly, it is directed to a thermocouple controlled safety valve, a plug type of manually operable valve having a manual mechanism for operating or resetting the safety valve, and a rod and tube type of thermostatic valve which adapts the assembly for use in gas water heaters.

One of the objects of the invention is to provide a very compact valve assembly of the above mentioned type which is of nice appearance and which utilizes a minimum of parts.

Another object of the invention is to provide a combination valve of the above mentioned type wherein the manual operable means for operating the plug valve and resetting the safety valve, has a very simple operation and one that turns in one direction of rotation from its "off" position to the "pilot" position and then to the "on" position.

Still another object of the invention is to provide a manual resetting mechanism in a valve of the above mentioned type wherein the manually operable dial must be depressed while the plug valve is in its "off" position before rotating it to the "pilot" position to reset the safety valve and supply gas to a pilot burner, thus providing safety reset of the valve.

Still other objects of the invention will become apparent upon reading the following detailed description of the invention in conjunction with the accompanying drawing wherein:

Figure 1 is an elevational view of the combination valve with the cover thereof removed and portions of the valve body broken away; and Figure 2 is a cross section of the valve taken along line 2—2 of Figure 1.

The combination valve has a main body portion 11 with a threaded inlet 12, a main outlet 13 for connection to a main burner, and a secondary outlet 14 for connection to a pilot burner. Extending inwardly from the bottom of the valve body is a bore 15 that intersects the inlet passage 12 and terminates in a valve seat 16 and a reduced diameter bore 17 through said valve seat. The bore 17 communicates with a chamber 18, which is open at its front face, or the front face of the valve body 11 so as to register with the chamber or recess 19 in the cover 20 for the valve body.

Threaded into the bore 15 is a conventional electromagnetic unit 21 which is adapted to be energized by a thermocouple heated by a pilot burner. This unit has a safety valve 22 carried by a valve stem 23 which, in turn, is connected to an armature (not shown) within the unit 21. A coil spring 24 normally biases the valve 22 against the valve seat 16 but is yieldable to permit the valve 22 to be moved to its open position and to reset the armature against the electromagnet (not shown) in the unit 21. This magnet of the conventional unit is adapted to hold the valve open when it is energized by the thermocouple but is of insufficient power to pull the valve to its "open" position by energization thereof.

The means for moving the valve 22 to the "open" position consists of a lever 25 pivoted on the front face of the valve body 11 by means of a pivot bolt 26. The lever has a transversally extending arm 25a which, in turn, has a transversally extending arm 25b that rests against the head of the armature carrying valve stem 23 when the valve 22 is closed. The lever also has a short transversally extending arm 25c at its other end for engagement by manually operable means to be presently described.

Extending inwardly from the front face of the valve body 11, actually above the main outlet 13 and at right angles thereto, is a conical bore 27 that communicates with the inner end of the bore 13. Extending inwardly from the inner end of the bore 27 is a threaded bore 28 into which is fitted a clicker disc assembly 29.

A plug valve 30 has a stepped co-axial bore 31 therein which terminates at its inner end in a reduced diameter bore 31a extending through the bottom wall of the plug valve and terminating at its upper end in a conical bore 31b which forms a valve chamber. A pair of notches 32 are formed in the outer surface of the plug valve in diametrically opposed relationship at the periphery of the conical bore 31b. A radial bore 33 extends through the side of the plug valve and is adapted to register with the outlet bore 13 in the "on" position of the plug valve. An arcuate groove 34 is formed in the periphery of the plug valve, intermediate its ends, and is of such length that it will register with a small bore 35 extending from the beveled surface 18a of recess 18 through the conical bore 27, in the "pilot" and "on" positions of the plug valve. Another small passage 36 extends from the conical bore 27, in the same plane as the bore 35, to a chamber 37 formed in the valve body, in alignment with the inlet of a conventional filter 38.

The valve 39 is resiliently biased against the bottom of the conical bore 31b in the plug valve by means of a coiled compression spring 40. The other end of the spring 40 bears against an abutment washer 41 staked to the inner end of a shaft 42 extending through a sealing grommet 43 positioned in an opening through the cover 20. A manually operable knob 44 is non-rotatably secured to the shaft 42 by means of a bolt 45. A compression spring 46 is preferably used to aid in holding the knob 44 in its outermost position but is yieldable to permit inward movement of the knob 44 for manually resetting the safety valve in a manner to be presently described.

A yoke 47 has a pair of inwardly extending fingers 48 that engage in the notches 32 in the plug valve for rotation thereof. The fingers 48 have longitudinally extending slots 49 therein through which a rod 50 extends to non-rotatably secure the yoke 47 to the shaft 42. A compression spring 51 normally biases the yoke 47 toward the plug valve so as to retain the fingers 48 in the notches 32. The slots 49 enable the knob 44 to be moved axially inwardly with respect to the plug valve by having the rod 50 slide in these slots 49. The rod 50 extends sufficiently far beyond the yoke 47 as to enable it to engage the arm 25c on the lever 25 when it is moved inwardly by the knob 44. The rod 50 is so positioned with respect to the plug valve that in the "off" position of the plug valve, it is to one side of the arm 25c so that by rotation of the plug valve while the knob is in its inwardly depressed position, the rod will engage the arm 25c and rock the lever 25 to open the valve 22 and reset the armature of the electromagnetic unit 21 as the plug valve reaches its "pilot" position. In this position, the arcuate groove 34 will be in registration with both the bore 35 and the bore 36 to enable gas to flow from the inlet 12 past the safety valve 22 and into the filter chamber. After the gas has passed into the filter chamber and through the filter 38, it will flow through a bore 52 past a flow-regulator valve 53 and out through the secondary outlet 14 to a pilot burner.

Upon the electromagnetic unit 21 becoming energized due to the heating of a thermocouple connected thereto by the pilot burner, releasing of the knob 44 will permit the springs 40 and 46 to return the knob to its outermost position and clear the rod 50 of the end of the arm 25c. The knob 44 may then be moved on in the same direction to the "on" position of the plug valve. In the "on" position of the plug valve, gas will flow from the inlet 12 past safety valve 22 through the chambers 18 and 19 and past the valve 39, provided it is open, and through the radial bore 31 and out of the main outlet 13 to the main burner of the heating installation.

The means for actuating the valve 39 may take various forms but is illustrated as being a rod 54 and tube 55 of conventional construction, mounted on a sleeve 56 having an outer threaded portion 57 and an inner threaded portion 58 at opposite ends thereof, with the portion 58 threaded upon an externally threaded boss 59 formed on the valve body 11. The inner end of the rod 54 extends through a guide washer 60 which is staked against an annular shoulder formed in the boss 59 at the outer end of the bore 28. The inner end of the rod 54 bears against a thin metallic diaphragm 61 which in turn bears against a movable fulcrum disc 62. The fulcrum disc has an annular knife edge fulcrum that bears against a snap disc 63 of washer shape and which has an inwardly extending actuating arm 64 that bears against a stem 65 threaded into the valve 39. The outer periphery of the snap disc 63 bears against a beveled shoulder of the snap disc housing 29 so that as the rod 54 moves inwardly toward the plug valve, the snap disc will be actuated to move the valve 39 to its "open" position with a snap action.

To enable the changing of the control point at which the snap disc will open the valve, an arm 66 is non-rotatably secured or clamped to the rod 54 and extends to the top of the valve body where it terminates in a transversally extending arm 67 that projects over the top surface of the valve body. The end of the arm 67 is pointed and is adapted to cooperate with indicia (not shown) on the top of the valve body to indicate the temperature setting of the valve. As the arm 67 is moved over the valve body, the rod 54 is threaded into or out of the end of the tube 55 to vary the position of the inner end of the rod 54, all in a manner well-known in the art.

*Operation*

The valve is illustrated in its shut down position and with the thermostatic valve in what is generally called a satisfied condition. To place the valve in operation, it is necessary to be sure that the plug valve is in its "off" position at the time that the knob 44 is depressed and then rotated to the "pilot" position. During the rotation to the pilot position, the rod 50 will engage the lever 25 to rock the safety valve 22 to its open or reset position. By igniting the pilot gas and holding the knob 44 in that position for a sufficient time for the electromagnetic unit to become energized, it is then possible to release the knob 44 and then move it on in the same direction of rotation to the "on" position of the plug valve. This will place the water heater in which the valve is mounted under the control of the thermostatic mechanism so that upon the water temperature dropping below the control point of the rod and tube, the rod will be moved inwardly by the shrinking of the tube 55 to snap the valve 39 to its "open" position. Upon the water temperature rising, the reverse action takes place to cause the valve to close. The valve will continue operating in this manner until either the plug valve is rotated to its "pilot" or "off" position or unless the pilot flame becomes extinguished causing de-energization of the electromagnet and safety closing of the valve 22.

While I have described the preferred embodiment of the invention, it is obvious that moderate changes may be made in the design without departing from the spirit of the invention. Therefore, the scope of the invention is determined from the appended claims.

I claim as my invention:

1. A valve comprising a valve body having an inlet and an outlet and a flow passage therebetween, a valve seat in said passage between said inlet and said outlet, a safety valve normally biased into seating engagement with said seat, condition responsive means for holding said valve open, a rotary plug valve in said passage and positioned between said valve seat and said outlet and being movable between "off" and "on" positions, a lever pivoted on said body and having one end positioned to engage and open the safety valve and the other end extending toward said plug valve, a handle having an axially slidable and non-rotatable connection with said plug valve, said connection having an arm thereon normally biased away from said lever so as to be rotatably clear of said lever but axially movable in the "off" position of said plug valve to position it in registration with said lever so that rotary movement thereof toward but short of its open position opens said safety valve.

2. A valve comprising a valve body having an inlet and a main outlet and a flow passage therebetween and a secondary outlet, a valve seat in said passage and adjacent said inlet, a safety valve normally biased into seating engagement with said seat, control means for holding said valve open, a rotary plug valve in said passage and positioned between said valve seat and said outlets and being movable between "off" and "pilot" and "on" positions in that sequence, said plug valve having main and secondary passages therein, a lever pivoted intermediate its ends and having one end positioned to engage and open the safety valve and the other end extending to a position over said plug valve, a handle having an axially slidable and non-rotatable connection with said plug valve, said connection having an arm thereon normally biased away from said plug valve and lever so as to be rotatably clear of said lever but axially movable in the "off" position of said plug valve to position it in registration with said lever so that rotary movement thereof to the "pilot" position thereof opens said safety valve.

3. In a combination valve having a valve body with an inlet and a main outlet and a secondary outlet, and first, second and third valve seats therein, a condition responsive safety valve normally biased into seating engagement with said first valve seat but movable to an open position, a rotary plug valve positioned at said second valve seat and said outlets and being movable between "off" and "pilot" and "on" positions in that sequence, said plug valve having main and secondary passages therein arranged to control fluid flow to said outlets, a control valve at said third valve seat, a lever pivoted intermediate its ends and having one end positioned to engage and open the safety valve and the other end extending to a position over said plug valve, a handle having an axially slidable and non-rotatable connection with said plug valve, said connection having an arm thereon normally biased away from said plug valve so as to be rotatably clear of said lever but axially movable in the "off" position of said plug valve to position it in registration with said lever so that rotary movement thereof to the "pilot" position opens said safety valve and permits fluid flow to said secondary outlet while preventing fluid flow to said control valve.

4. The combination comprising a main valve body portion having an inlet and a main outlet and a secondary outlet, a valve seat near said inlet, a safety valve normally biased into seating engagement with said seat, a rotary plug valve positioned between said valve seat and said outlets and being movable between "off" and "pilot" and "on" positions in that sequence, said plug valve having main and secondary passages therein, said main passage including an axial bore in one end of the plug valve, a lever pivoted intermediate its ends on an outer surface of said body portion and having one end positioned to engage and open the safety valve and the other end extending to a position over said plug valve, a recessed cover positioned over said plug valve and said lever and forming a passage for the flow of fluid from said first valve to said plug valve, a handle having an axially slidable and non-rotatable connection with said plug valve, said connection having an arm thereon normally biased away from said plug valve so as to be rotatably clear of said lever but axially movable in the "off" position of said plug valve to position it in registration with said lever so that rotary movement thereof to the "pilot" position opens said safety valve.

References Cited in the file of this patent

UNITED STATES PATENTS

| | | |
|---|---|---|
| 2,658,514 | Meusy | Nov. 10, 1953 |
| 2,703,095 | Ray | Mar. 1, 1955 |
| 2,746,472 | Sogge | May 22, 1956 |